Aug. 2, 1960  R. D. THOMPSON  2,947,346
METHOD AND APPARATUS FOR MAKING FOAM-BACKED MATERIALS IN BROAD
WIDTHS AND PRODUCT THEREOF
Original Filed Jan. 27, 1954  3 Sheets-Sheet 1
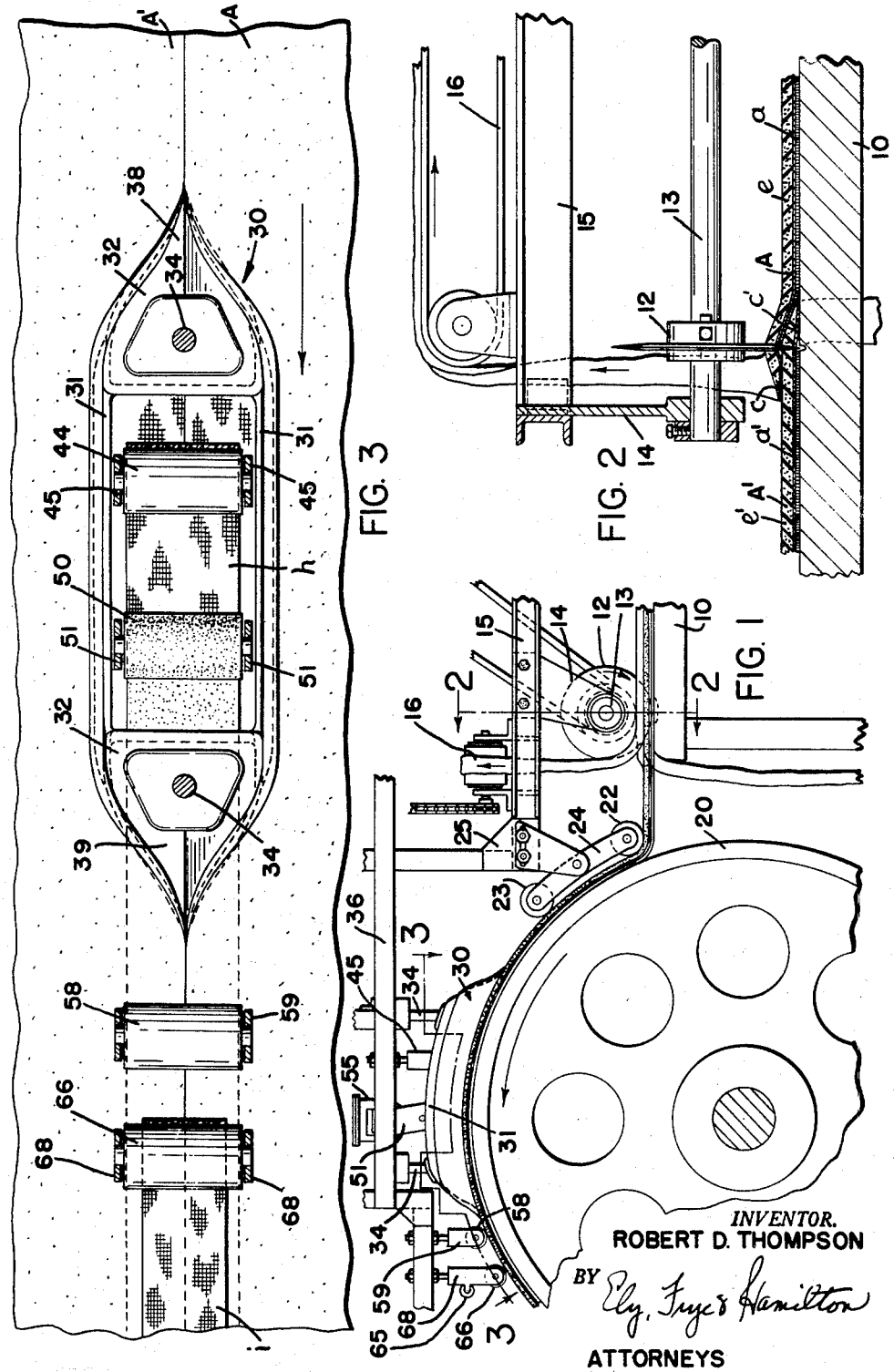
INVENTOR.
ROBERT D. THOMPSON
BY
ATTORNEYS

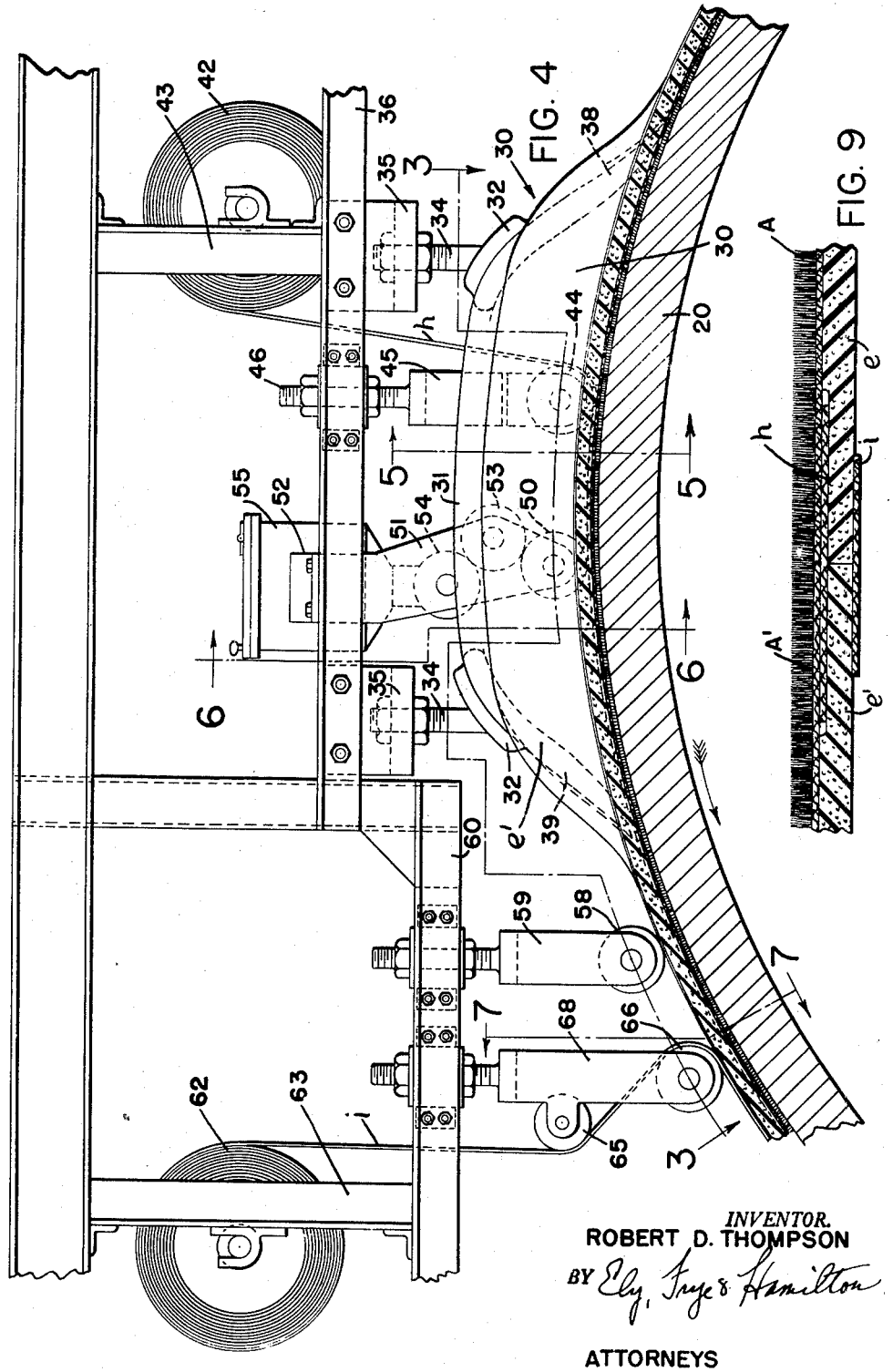

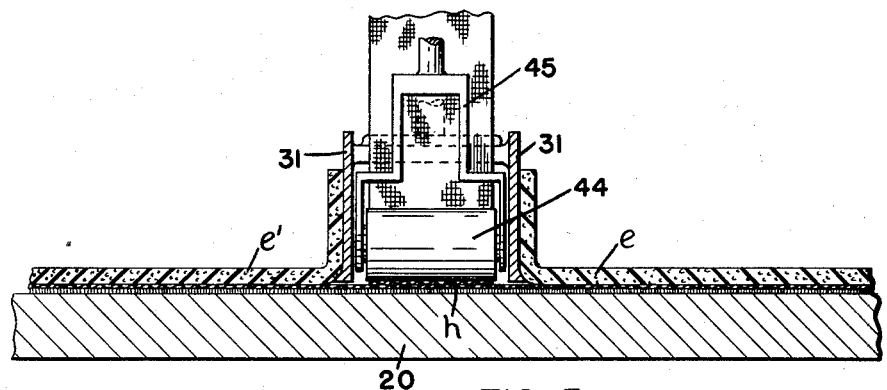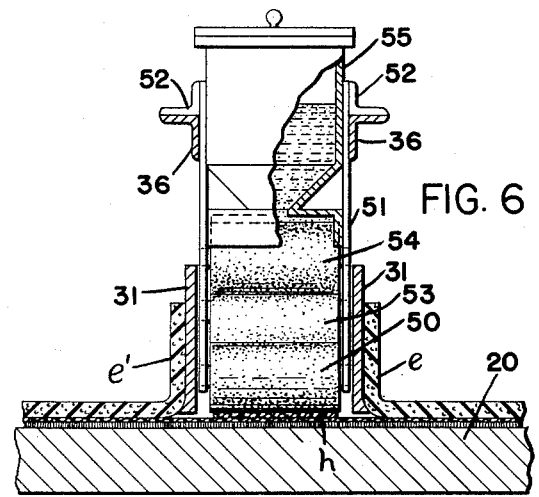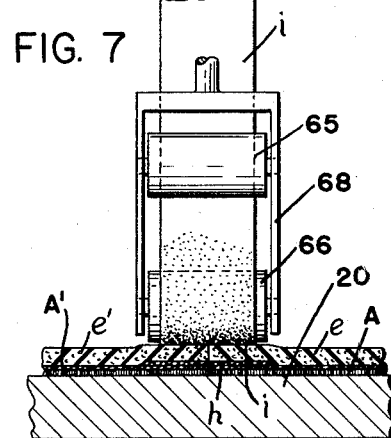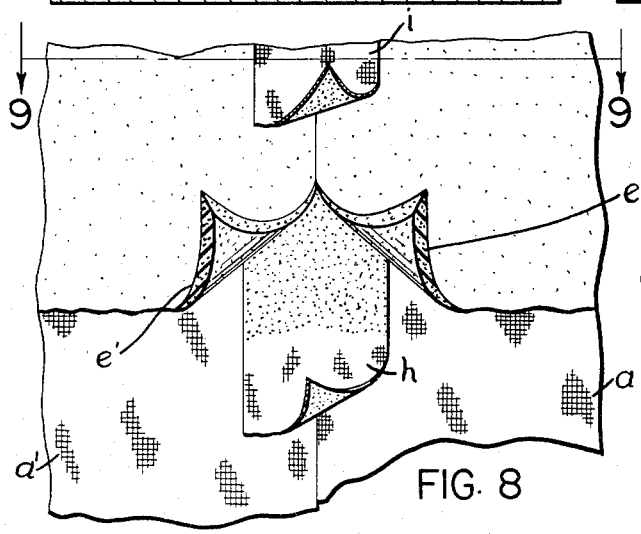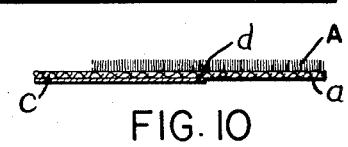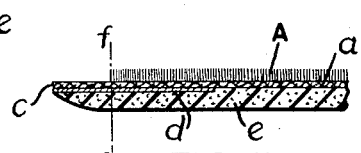
INVENTOR.
ROBERT D. THOMPSON
ATTORNEYS

United States Patent Office 2,947,346
Patented Aug. 2, 1960

2,947,346

METHOD AND APPARATUS FOR MAKING FOAM-BACKED MATERIALS IN BROAD WIDTHS AND PRODUCT THEREOF

Robert D. Thompson, 1115 Jefferson Ave., Akron, Ohio

Continuation of application Ser. No. 406,560, Jan. 27, 1954. This application Oct. 25, 1956, Ser. No. 620,785

14 Claims. (Cl. 154—42.3)

This application is a continuation of my copending application Serial No. 406,560, filed January 27, 1954, now abandoned.

The present invention has been perfected primarily for the manufacture of carpeting which is provided with an adherent underlay or cushion of foamed latex rubber sponge. The particular type of carpet material to which this invention is especially adapted is that type of sponge rubber backed carpeting in which the rubber latex foam is applied directly to the carpeting and then gelled and cured in place thereon. By this method the rubber foam penetrates into the base of the carpet, where it is vulcanized. While other processes and machines may be found to make the sponge rubber backed carpet, it is preferred to use the process and apparatus of Alderfer Patent No. 2,628,654, dated February 17, 1953.

The machine of the Alderfer patent, as well as other machines in use in the manufacture of sponge rubber sheeting, have definite limitations as to the widths of material which may be coated and, in answer to demands for wider materials, it has been found necessary to splice widths by hand.

The invention of this application is for the purpose of developing a new and improved procedure for splicing widths of sponge rubber backed carpeting or other products quickly, easily, and with the minimum of waste and labor. In addition the splicing operation will be done so accurately that there is little or no visible evidence from the upper surface of the carpet that splicing has taken place, and the splice will be strong and will hold indefinitely.

The invention relates both to the method employed for the process and also to a machine by which the method may be carried out with less labor and supervision. As the spliced product is new, that is also a part of the invention.

While the invention is particularly directed to the splicing of carpeting, it is not confined to that product but may be used for other materials.

In the drawings there are shown sufficient of the steps of the process to enable the invention to be understood and there is also illustrated a machine which has been designed to carry out the splicing operations for the edges of two strips of carpet. In the drawings, the best known and preferred form of the machine is shown, it being understood that changes, modifications and improvements may be made without sacrificing the benefits of the invention.

In the drawings,

Fig. 1 is a side elevation of an apparatus for performing the splicing operation.

Fig. 2 is a section on the line 2—2 of Fig. 1.

Fig. 3 is a top plan view of that portion of the machine where the splicing is done, the view being taken on the line 3—3 of Figs. 1 and 4.

Fig. 4 is an enlarged side elevations of the parts of the machine shown in Fig. 3.

Figs. 5, 6 and 7 are sections on the lines 5—5, 6—6, and 7—7, respectively, of Fig. 4.

Fig. 8 is a view looking at the underside of a section of spliced carpeting showing the various layers of material constituting the complete assembly.

Fig. 9 is a section through the spliced carpeting on the line 9—9 of Fig. 8.

Fig. 10 is a section through the selvage of a carpet material showing the first step in the process.

Fig. 11 is a similar section showing the second step in the process.

In the application of sponge rubber to carpeting, the older method consisted in making a layer of sponge rubber and adhesively attaching the vulcanized layer to the back of the carpet. As improved method which may be carried on in the machine of the Aldefer patent referred to above is to flow a layer of unvulcanized and ungelled latex foam against the back of the carpet which, because the foam is largely water, will penetrate into the backing of the carpet. The latex foam contains gelling and vulcanizing agent and after the foam is applied in an even layer to the back of the carpet, the carpet is first led through a heated chamber where the foam is gelled and thence to a second chamber where the carpet is exposed to heated air which is caused to circulate around and through the composite material, vulcanizing the foam and removing any objectionable odors.

In applying a layer of foam to a width of carpeting, the foam will be extended close to the selvage edges so that when the selvage is trimmed the thickness of the sponge will be uniform throughout the carpet.

In the rug and carpet industry, carpeting has been spliced by the use of a tape backing applied on the underside of two adjacent breadths of carpet along the butt-seam.

It is impossible, however, to apply this method to butt-splicing of rubber sponge backed carpeting because the underlying layer of foam lacks tensile strength and stability, and will tear easily.

The process described herein consists in so modifying the old processes of applying sponge rubber to carpet and it is possible to obtain as strong a butt-splice or seam as when there is no rubber sponge backing on the carpet.

Briefly stated, the process consists in laying on or loosely attaching to the edge of the carpet to be spliced and along the underside of the selvage, a removable shield or foam latex impermeable barrier which will be interposed between the latex foam and the underside of the carpet to provide the underside of the carpeting with a band or area extending laterally inwardly from the selvage edge and which will not become firmly attached to the rubber sponge when cured and which will be of sufficient width to afford a good anchorage for the splicing tape. Then, the rubber sponge is cured and bonded to the underside of the carpet.

The next step is to longitudinally trim the selvage from two breadths of carpet to be spliced and to bring the edges of the carpet into abutment. The edges of the foamed layers are then turned up to expose the unrubberized edge areas of the fabric base and the splicing tape is inserted and adhesively secured to the edges of the adjacent carpet breadths.

The splicing tape is preferably a film of plastic sheeting or a strong fabric frictioned on one side and preferably later adhesively coated on the other side so that when the seam is rolled in place, the two carpet strips will be securely joined and the edges of the rubber foam will not be separable from the carpet. The adhesive coatings on the splicing tape may be a vulcanizable or heat setting coating and the application of heat to the finished seam will make a firm bond.

If desired, a second tape or finishing tape may be applied over the exterior of the seam.

The material which is used as the foam latex impermeable barrier between the foam and the base of the carpet may be a gauze or paper and thrown away when the splice is made, or it may be a coating of paint or shellac which will prevent the rubber foam from penetrating into the base of the carpet.

In the drawings the numerals A and A' are applied to two breadths of carpeting which it is desired to butt-splice along their adjacent edges, the wearing surface of each breadth being a pile fabric woven in the usual manner to the loosely woven base a or a'. Each breadth of carpet has the usual selvage c or c'.

Prior to introducing the carpet breadth into the apparatus which applies the rubber foam, the impermeable barrier referred to above is applied to the underside of the carpet along the selvage edge and the band thereof extends laterally inwardly a sufficient distance to form a pocket of the desired extent beneath the edge of the carpet. Such a shield or latex foam impermeable barrier is shown at d. As noted above, this may be paper, gauze, foil, or even a coating of shellac or paint. If paper or gauze or foil is used, this may be removed just before the splicing operation; if paint or shellac is used, it should be of such a character that the splicing tape will adhere to it with sufficient tenacity to form a firm bond.

The carpet is now coated on its underside with a layer of latex-foam of the desired depth, which will penetrate the base of the carpet laterally of the barrier, but which cannot penetrate and adhere to the barrier. Such a layer of foam is indicated at e or e'. When it is gelled and cured, it will form a soft yielding layer permanently attached by a vulcanized bond to the underside of the carpet. Because the sponge layer is composed of a multitude of small cells located in the rubber and communicating with each other and with the interstices of the carpet, the carpet will ventilate throughout.

The next step in the process is to longitudinally trim the selvage from the edges of the carpet to a line within the pile fabric, such a line being indicated by the line f—f in Fig. 11. The sponge rubber can now be turned back in the area of the barrier d and the barrier may be removed and disposed of if paper, gauze or foil was used. The edges of the carpeting are then abutted and the splicing strip h is laid in the pockets thus exposed and firmly bonded to the underside of the selvage edges of the carpet.

The edges of the sponge rubber layer are now replaced and sealed to the splicing strip, if desired, and as a final step the finishing tape i may be now applied and adhered over the splice between the two carpet breadths.

The method as described is not only novel but the spliced product is likewise new and useful.

The apparatus comprises a table 10 on which the two strips A and A' of carpet having the sponge rubber backing vulcanized thereon are laid with the selvage edges overlapping as shown in Fig. 2. The two strips of carpet are fed into the revolving knife 12 mounted on a driven shaft 13 supported in brackets 14 depending from a framework 15. The knife 12 cuts off the two selvage edges, that from the upper carpet A being conducted upwardly onto a belt 16 which carries it away. The other selvage edge for the lower carpet A' is led over the end of the table 10, where it falls into a scrap container.

The two strips of carpet, which, after they leave the knife 12, are trimmed and butted together, are now transferred to any suitable conveyer on which they are to be spliced. A type of such conveyor is the large drum 20 which is driven in the direction of the arrow in Fig. 1. This drum is of sufficient width to support the two strips of carpet.

The carpet strips or breadths are pressed against the surface of the drum 20 by two rollers 22 and 23 carried in a frame 24 depending from an adjustable bracket 25 at the end of the supporting frame 15. These rollers serve to hold the two breadths of carpeting against the drum and in edge-to-edge relation with the foamed rubber on the outside of the drum.

As the carpet breadths approach the top of the drum, they meet the plow-shaped leading end of a generally oblong frame indicated as a whole by the numeral 30. The underside of the frame is curved so as to clear the carpet on the surface of the drum and has two parallel upright walls which are joined at either end to triangular end plates 32 which are suspended by adjustable bolts 34, the upper ends of which are held in brackets 35 that are attached to a pair of horizontal beams 36 forming a part of an overhead structure.

The ends of the plates 32 are tapered toward one another and toward the surface of the drum to form two plow-shaped ends, indicated by the numerals 38 and 39 in Fig. 3, the points of the plows coinciding with the line of separation between the two carpet breadths and spaced from the surface of the drum so as to clear the edges of the carpet. As the two breadths of carpet approach the plow, the two edges of the rubber sponge e and e' are lifted and turned back as shown in Figs. 5 and 6. They will ride along the walls 31 until the plow 39 is reached, whereupon they will return to their original positions.

During the period that the rubber layers are lifted, the undersides of the carpets are exposed and during this time the splicing tape h is applied to the edges of the carpet.

The tape h is supplied from a supply roll 42 which is supported on side rails 43 of the upper framework. One side of this tape is coated with a tacky adhesive which will adhere the tape to the exposed underside of the carpet. From the supply roll 42 the tape is led under a pressure roller 44 held in a fork 45 suspended by the adjustable bolt 46 from the beams 36. This roll applies the tape to the carpet edges with considerable pressure so that the tape is firmly attached to both strips of carpet.

After the splicing tape is applied it is led beneath a roller 50 which applies to the upper surface of the tape a cement which will adhere the flaps of the rubber sponge to the tape. The roller 50 is located at the lower end of side frames 51 which are supported from brackets 52 resting upon the beams 36. The roller 50 receives the cement from a series of feed rollers 53 and 54, the latter being supplied from the tank 55 located in the upper ends of the frame 51.

The freshly cemented splicing tape is in condition to receive the flaps of the sponge rubber layer which follow down over the plow 39 and thence to a pressure roller 58 mounted in a fork 59 adjustably suspended from an extension 60 of the beams 36. This rolls the unattached edges of the sponge rubber in place against the tacky surface of the tape h.

If the finishing strip i is applied, this is stored in a roll 62 mounted in brackets 63 on the upper supporting structure, the strip being conducted over a guide roll 65 and beneath a pressure applicator roll 66 mounted in a fork 68 which is adjustably suspended from the beams 60 by threaded bolts 69. The surface of the finishing strip i is adhesively coated on the side which is applied to the surfaces of the foam.

If desired, that portion of the drum adjacent the seam may be heated to facilitate the setting of the various adhesives.

It will be seen that there is provided a method and apparatus by which a firm connection may be made between two lengths of carpeting having applied thereto a sponge rubber backing and particularly one in which the sponge rubber backing is connected to the carpeting by a permanent vulcanized bond. While the process and apparatus are shown as uniting only two widths of carpeting, the number of widths may be increased if desired. While a large drum such as shown at 20 is preferred, a conveyer of the belt type may be substituted in which case the frame 31 will be shaped accordingly. Where the term "conveyer" is used in the claims, it will be understood that this is meant in the broad sense and will cover any type of supporting and conveying device. It is also possible to move the whole frame 30 relative to the carpet.

What is claimed is:

1. An apparatus for the manufacture of multiple strips of carpet having layers of vulcanized sponge rubber attached to the undersides thereof, comprising means for conveying two strips of carpet in edge-to-edge relation, means for separating the adjacent edges of the sponge rubber layers from the undersides of the strips, means to apply a splicing element having an adhesive coated side with said coated side in contact with the exposed undersides of the strips while the sponge rubber layers are separated from the strips, and means to adhesively unite the edges of the sponge rubber layers to the other side of said splicing element.

2. An apparatus for the manufacture of multiple breadths of carpet having layers of vulcanized sponge rubber attached to the undersides thereof, comprising means for conveying two strips of carpet while in edge-to-edge relation, a plow for lifting the layers of sponge rubber from the undersides of the strips, means to apply a splicing tape having an adhesive coated side with said coated side in contact with the exposed undersides of the strips while the sponge rubber layers are separated from the strips, and means to adhesively unite the edges of the sponge rubber layers to the other side of said splicing tape.

3. An apparatus for the manufacture of multiple breadths of carpet having layers of vulcanized sponge rubber attached to the undersides thereof, comprising means for conveying two strips of carpet while in edge-to-edge relation, a plow for lifting the layers of sponge rubber from the undersides of the strips, means to apply a splicing tape having an adhesive coated side with said coated side in contact with the exposed undersides of the strips, means to return the edges of the sponge rubber layers and seal them against the tape, and means to adhesively unite the edges of the sponge rubber layers to the tape.

4. Apparatus for joining strips of carpet having layers of vulcanized sponge rubber attached to the undersides thereof, comprising a knife for trimming the edges of two carpet strips, a cylindrical conveyor means to receive the two strips after the trimming operation, means to lift the edges of the sponge rubber layers, means operative while said edges are in raised position to apply a splicing strip having an adhesive coated side with said coated side in contact with the exposed edges of the carpet strips, and means to apply adhesive to the other side of said splicing member.

5. Apparatus for joining strips of carpet having layers of vulcanized sponge rubber attached to the undersides thereof, comprising a knife for trimming the edges of two carpet strips, a cylindrical conveyor means to receive the two strips after the trimming operation, a plow to lift the edges of the sponge rubber layers, an applicator behind the plow to attach a splicing strip having an adhesive coated side with said coated side in contact with the junction line of the sponge rubber layers while the sponge rubber layers are separated from the strips, and means to apply adhesive to the other side of said splicing member.

6. Apparatus for joining strips of carpet having layers of vulcanized sponge rubber attached to the undersides thereof, comprising a knife for trimming the edges of two carpet strips, a cylindrical conveyor means to receive the two strips after the trimming operation, a plow to lift the edges of the sponge rubber layers, an applicator behind the plow to attach a splicing strip having an adhesive coated side with said coated side in contact with the junction line of the sponge rubber layers, means to turn the edges of the sponge rubber layers back onto the carpet strips and attach them to the carpet strips, and means to adhesively unite the edges of the sponge rubber layers to the other side of said splicing strip.

7. A method of splicing strips of sponge rubber backed carpeting to provide multiple widths of carpeting comprising the steps of: applying a foam latex impermeable barrier to the underside of said strips in a relatively narrow band extending along the selvage edges thereof; applying a layer of foam latex over the entire underside of each strip including said band; curing said layer so that it becomes bonded to said strip except in the area of said band; longitudinally trimming along the selvage edge of each strip and locating the trimmed edges in abutment; separating said cured layers from said strips in the area of said bands; inserting a splicing tape between said separated layers and strips, and securing said tape to the underside of said strips in the area of said bands.

8. A method of splicing strips of sponge rubber backed carpeting to provide multiple widths of carpeting comprising the steps of: applying a foam latex impermeable barrier to the underside of said strips in a relatively narrow band extending along the selvage edges thereof; applying a layer of foam latex over the entire underside of each strip including said band; curing said layer so that it becomes bonded to said strip except in the area of said band; longitudinally trimming along the selvage edge of each strip and locating the trimmed edges in abutment; separating said cured layers from said strips in the area of said bands; inserting a splicing tape between said separated layers and strips; turning said separated layers back over said splicing tape; and adhesively securing said tape to said layers and strips in the area of said bands.

9. A method of splicing strips of sponge rubber backed carpeting to provide multiple widths of carpeting comprising the steps of: applying a foam latex impermeable barrier to the underside of said strips in a relatively narrow band extending along the selvage edges thereof; applying a layer of foam latex over the entire underside of each strip including said band; curing said layer so that it becomes bonded to said strip except in the area of said band; longitudinally trimming along the selvage edge of each strip and locating the trimmed edges in abutment; separating said cured layers from said strips in the area of said bands; inserting a tape having an adhesive coated side between said separated layers and strips, said coated side facing said strips, applying adhesive to the other side of said tape; and securing said tape to said layers and strips in the area of said bands.

10. A method of splicing strips of sponge rubber backed carpeting to provide multiple widths of carpeting comprising the steps of: detachably securing a foam latex impermeable barrier to the underside of said strips providing a relatively narrow band extending along the selvage edges thereof; applying a layer of foam latex over the entire underside of each strip including said band; curing said layer so that it becomes bonded to said strip except in the area of said band; longitudinally trimming along the selvage edge of each strip and removing said barrier; locating the trimmed edges in abutment; separating said cured layers from said strips in the area of said bands; inserting a splicing tape between said separated layers and strips; and securing said tape to the underside of said strips in the area of said bands.

11. A method of splicing strips of sponge rubber backed carpeting to provide multiple widths of carpeting comprising the steps of: detachably securing a foam latex impermeable barrier to the underside of said strips providing a relatively narrow band extending along the selvage edges thereof; applying a layer of foam latex over the entire underside of each strip including said band;

curing said layer so that it becomes bonded to said strip except in the area of said band; longitudinally trimming along the selvage edge of each strip and removing said barrier; locating the trimmed edges in abutment; separating said cured layers from said strips in the area of said bands; inserting a splicing tape between said separated layers and strips; turning said separated layers back over said splicing tape; and adhesively securing said tape to said layers and strips in the area of said bands.

12. A method of splicing strips of sponge rubber backed carpeting to provide multiple widths of carpeting comprising the steps of: detachably securing a foam latex impermeable barrier to the underside of said strips providing a relatively narrow band extending along the selvage edges thereof; applying a layer of foam latex over the entire underside of each strip including said band; curing said layer so that it becomes bonded to said strip except in the area of said band; longitudinally trimming along the selvage edge of each strip and removing said barrier; locating the trimmed edges in abutment; separating said cured layers from said strips in the area of said bands; inserting a tape having an adhesive coated side between said separated layers and strips, said coated side facing said strips; applying an adhesive to the other side of said tape; and securing said tape to said layers in the area of said bands.

13. A method of splicing strips of sponge rubber backed carpeting to provide multiple widths of carpeting comprising the steps of: detachably securing a foam latex impermeable barrier to the underside of said strips providing a relatively narrow band extending along the selvage edges thereof; applying a layer of foam latex over the entire underside of each strip including said band; curing said layer so that it becomes bonded to said strip except in the area of said band; longitudinally trimming along the selvage edge of each strip and removing said barrier; locating the trimmed edges in abutment; separating said cured layers from said strips in the area of said bands; inserting a tape having an adhesive coated side between said separated layers and strips, said coated side facing said strips; applying an adhesive to the other side of said tape; securing said tape to said layers in the area of said band; and attaching a finishing strip along the line of abutment of said layers.

14. A method of splicing strips of sponge rubber backed carpeting to provide multiple widths of carpeting comprising applying to the underside of two carpet strips to be joined a layer of foam latex, providing a foam latex impermeable barrier along the edge of each strip, curing each layer of foam latex so that it becomes bonded to a strip except in the area of each barrier, opening the unbonded area along abutting edges of the strips, and securing a splicing tape in said unbonded area to both of said strips.

References Cited in the file of this patent
UNITED STATES PATENTS

| | | |
|---|---|---|
| 1,217,252 | Williamson | Feb. 27, 1917 |
| 1,924,551 | Higgins | Apr. 29, 1933 |
| 2,524,456 | Masland | Oct. 3, 1950 |
| 2,659,687 | Moore | Nov. 17, 1953 |